United States Patent
Funke et al.

(10) Patent No.: US 8,864,227 B2
(45) Date of Patent: Oct. 21, 2014

(54) SEAT DEVICE COMPRISING AN ENERGY ABSORPTION UNIT

(75) Inventors: Matthias Funke, Keller, TX (US); Jan Martens, Schwäbisch Hall (DE)

(73) Assignee: RECARO Aircraft Seating GmbH & Co. KG, Schwabisch Hall (DE)

( * ) Notice: Subject to any disclaimer, the term of this patent is extended or adjusted under 35 U.S.C. 154(b) by 214 days.

(21) Appl. No.: 13/514,305

(22) PCT Filed: Dec. 7, 2010

(86) PCT No.: PCT/EP2010/007430
§ 371 (c)(1),
(2), (4) Date: Nov. 14, 2012

(87) PCT Pub. No.: WO2011/069641
PCT Pub. Date: Jun. 16, 2011

(65) Prior Publication Data
US 2013/0049416 A1    Feb. 28, 2013

(30) Foreign Application Priority Data

Dec. 11, 2009  (DE) .......................... 10 2009 057 880

(51) Int. Cl.
*B60N 2/42* (2006.01)
*B60N 2/427* (2006.01)

(52) U.S. Cl.
USPC ................................ 297/216.13; 297/216.14

(58) Field of Classification Search
CPC ............. B60N 2/4228; B60N 2/42745; B60N 2/42709; B60N 2/427; B60N 2/22; B60R 2022/286
USPC ........................................ 297/216.13, 216.14
See application file for complete search history.

(56) References Cited

U.S. PATENT DOCUMENTS 4,145,081 A  *  3/1979  Withers ................... 297/216.14
4,349,167 A      9/1982  Reilly
(Continued)

FOREIGN PATENT DOCUMENTS

| DE | 198 07 581 A1 | 9/1998 |
| DE | 19807581 A1 | 9/1998 |
| DE | 10 2006 003 617 | 7/2007 |
| EP | 2127941 A1 * | 12/2009 |
| WO | WO 2008/115103 A1 | 9/2008 |

OTHER PUBLICATIONS

International Search Report mailed on Aug. 9, 2011 for the corresponding International patent application No. PCT/EP2010/007430 (English copy enclosed).

(Continued)

*Primary Examiner* — Jeanette E. Chapman
(74) *Attorney, Agent, or Firm* — Posz Law Group, PLC

(57) ABSTRACT

The invention is directed to a method for absorbing energy in a motor vehicle seat in the case of a collision etc., and to an energy-absorption device for implementing said method.
The method comprises the step of providing a removable deformation element in or at the vehicle seat, preferably in a space thereto provided in the fitting provided for inclining the backrest of the vehicle seat. The energy-absorption device implemented as the deformation element comprises at least one deformation portion which is deformable in a collision, thus absorbing energy.
The invention is also directed to a fitting for inclining the backrest, the fitting having a space for mounting the deformation element.
The invention is in especially provided to avoid in particular damages to the nape of the neck in the case of collisions from the rear. By use of a separate releasable deformation element certain information on the collision forces is made available, which facilitates deciding whether to replace or to re-use the vehicle seat.

17 Claims, 9 Drawing Sheets

(56) References Cited

U.S. PATENT DOCUMENTS

| | | | |
|---|---|---|---|
| 4,394,047 A | | 7/1983 | Brunelle |
| 5,320,308 A | | 6/1994 | Bilezikjian et al. |
| 5,676,421 A | * | 10/1997 | Brodsky .................. 297/216.13 |
| 6,053,571 A | * | 4/2000 | Faigle ...................... 297/216.13 |
| 6,109,690 A | * | 8/2000 | Wu et al. .................. 297/216.13 |
| 6,709,053 B1 | * | 3/2004 | Humer et al. .............. 297/216.1 |
| 7,992,934 B2 | * | 8/2011 | Cailleteau ................ 297/216.14 |
| 2007/0158983 A1 | | 7/2007 | Yokota et al. |
| 2010/0013279 A1 | | 1/2010 | Cailleteau |
| 2010/0176621 A1 | | 7/2010 | Aufrere et al. |

OTHER PUBLICATIONS

German Search Report mailed on Nov. 29, 2010 for the corresponding German patent application No. 10 2009 057 880.3.

German Search Report mailed on Nov. 29, 2010 for the corresponding German patent application No. 10 2009 057 880.3 (with partial English translation).

International Preliminary Report on Patentability and Written Opinion mailed on Jul. 12, 2012 (with English translation).

* cited by examiner

US 8,864,227 B2

SEAT DEVICE COMPRISING AN ENERGY ABSORPTION UNIT

CROSS REFERENCE TO RELATED APPLICATIONS

This application is a U.S. national stage application of PCT/EP2010/007430 filed on Dec. 7, 2010, and claims priority to, and incorporates by reference, German patent application No. 10 2009 057 880.3 filed on Dec. 11, 2009.

BACKGROUND

In the event of vehicles which are intended for carrying passengers, and are equipped with passenger seats for this purpose, being subjected to impact, it is particularly important for the energy which is released upon the sudden deceleration to be deflected away from the passengers.

U.S. Pat. No. 4,349,167 has already disclosed a passenger seat which has a plurality of energy-absorption elements.

It is an object of the present invention, in particular, to provide a straightforward, cost-effective and space-saving solution for absorbing movement energy in the event of vehicles being subjected to impact.

SUMMARY

This object is achieved by a seat arrangement of a passenger seat as claimed in patent claim 1. Further advantageous developments of the invention can be gathered from the dependent claims.

The invention proceeds from a seat arrangement of a passenger seat which has a backrest, which can be adjusted, in a normal adjustment range, from at least one stable comfort position, by movement in a forward direction, into a normal position, and a seat structure, for fastening the passenger seat on a floor, having at least one supporting element, for coupling the backrest to the seat structure, and having at least one energy-absorption unit, for absorbing movement energy in the event of impact.

It is proposed that the energy-absorption unit comprises the at least one supporting element and an energy-absorption element, which is formed separately from the supporting element, and the at least one supporting element and the energy-absorption element interact, in the event of impact, in order to dissipate impact energy. "Separately" in this context is intended to mean, in particular, that the supporting element and the energy-absorption element are formed in at least two parts. This makes it possible to provide a straightforward and space-saving solution for absorbing movement energy in the event of vehicles being subjected to impact. The separately formed energy-absorption element of the energy-absorption unit, furthermore, allows unobstructed movement of the backrest in the normal adjustment range and transmission of movement energy to the energy-absorption element only in the event of impact. The seat arrangement, furthermore, can advantageously be retrofitted in existing passenger seats.

Furthermore, it is proposed that the energy-absorption unit has a delay element which, in the event of impact, once the normal adjustment range of the backrest has been exceeded, delays the dissipation of impact energy by a predetermined period of time. In particular in the case of passenger seats which are arranged one behind the other, with the same orientation, in a number of seat rows, this makes it possible, with an appropriate configuration, to achieve the situation where, in the event of impact, a passenger, as he strikes against a backrest of the seat row arranged in front of him, avoids zones of the backrest which are known to be particular causes of injury.

If, within the normal adjustment range of the backrest, there is a first path by means of which a force which acts on the backrest is introduced into the seat structure and, when the normal adjustment range of the backrest is exceeded, there is a second path by means of which a force which acts on the backrest is introduced into the seat structure, and the energy-absorption element causes a flux of force to be deflected from the first force-introduction path to the second force-introduction path, it is possible to achieve effective deflection of the action of force by way of the energy-absorption element for energy-absorbing purposes.

The at least one supporting element advantageously has at least one bearing element with a bearing axis for bearing the backrest in a rotatable manner, this making it possible for the seat arrangement of the passenger seat to be particularly compact.

In addition, it is proposed that the seat arrangement comprises at least one coupling element which, when the normal adjustment range of the backrest is exceeded, subjects the at least one energy-absorption element to a torque about the bearing axis, as a result of which, in the event of impact, the force can be transmitted particularly straightforwardly from the backrest to the energy-absorption element.

The torque about the bearing axis, to which the at least one energy-absorption element is subjected by the coupling element when the normal adjustment range of the backrest is exceeded, particularly advantageously causes the energy-absorption element to be clamped, this making it possible for energy to be transmitted straightforwardly and effectively to the energy-absorption element.

If the energy-absorption element is provided in order to absorb energy by plastic deformation when the normal adjustment range of the backrest is exceeded, it is possible, in the event of impact, for the movement energy of the backrest to be converted effectively into deformation energy.

It is also proposed that the energy-absorption element has at least one weakening element for weakening the mechanical strength. The at least one weakening element makes it possible for the mechanical strength to be adapted straightforwardly to forces to which the backrest is expected to be subjected in the event of impact, in order for energy absorption by the energy-absorption element to be optimized.

If the energy-absorption element has at least two weakening elements, which are provided in order to define a predetermined breaking direction in the case of the second force-introduction path, which is generated as a result of the normal adjustment range of the backrest being exceeded, controlled deformation of the energy-absorption element can be achieved. It is particularly advantageous for the energy-absorption element to have weakening elements which define at least two predetermined breaking directions, which preferably run parallel, this making it possible, in the event of impact, for the energy-absorption element to be divided up in a controlled manner into a plurality of portions. If the division into a plurality of portions is accompanied by an increase in spacing between the individual portions, it is possible, in particular, for an existing air-traffic safety requirement, according to which easy adjustment of the backrest into the normal position has to be ensured following commencement of impact, to be met in a particularly straightforward manner.

Moreover, it is proposed that the energy-absorption element comprises at least one centering element, which is provided in order to center the energy-absorption element in the case of the normal adjustment range of the backrest being exceeded, as a result of which, in the event of impact, during deformation of the energy-absorption element, movement of the energy-absorption element can be guided to good effect and controlled force transmission is possible. It is particularly advantageous for the supporting element to have a centering element, which corresponds to the centering element of the energy-absorption element. It is quite particularly advantageous if the centering element of the supporting element has a wedge-shaped cross section since, with an appropriate configuration, in addition to a centering action, the supporting element can have an effective cutting action, which makes it possible for the energy-absorption element to absorb a large amount of energy.

Furthermore, it is proposed that the energy-absorption unit has at least one securing element, which is provided in order to limit movement of the backrest, within the normal adjustment range, in at least one direction and, in the case of a predetermined force to which the backrest is subjected in at least one direction being exceeded, in order to allow the adjustment range of the backrest to be exceeded. It is thus advantageously possible to control the movement of the backrest, in a normal operating mode of the passenger seat, within the normal adjustment range and, in the event of impact, exceeding the adjustment range of the backrest in a controlled manner allows movement energy to be transmitted from the backrest to the energy-absorption unit.

If deformation energy absorbed by the energy-absorption element once the normal adjustment range of the backrest has been exceeded is essentially proportional to a displacement distance covered by the energy-absorption element, it is advantageously possible to avoid sudden accelerations during the absorption of energy in the energy-absorption element and to achieve uniform dissipation of movement energy from the backrest. "Essentially linear" in this context is intended to mean, in particular, that a proportionality factor between the energy absorbed by the energy-absorption element and the displacement distance covered by the energy-absorption element varies by less than 50%.

Furthermore, it is proposed that the energy-absorption element engages around the supporting element at least in part. This makes it possible to achieve good guidance of the energy-absorption element during deformation, effective transmission of energy and a compact construction for the energy-absorption unit. "Engage around" in this context is intended to mean, in particular, that the energy-absorption element covers at least part of one surface of the supporting element and at least part of a surface of the element which is adjacent to said first-mentioned surface.

It is particularly advantageous in production terms if the energy-absorption element has a U-shaped profile in at least one section plane, since, with an appropriate configuration, the energy-absorption element can be produced straightforwardly and cost-effectively by bending and punching. The U-shaped forming operation, at the same time, makes it possible for forces to be introduced advantageously into the energy-absorption element.

If the energy-absorption element consists essentially of stainless steel, it is advantageously possible for large amounts of energy to be absorbed and, by using known deformation methods, for cost-effective solutions to be provided. "Essentially" in this context is intended to mean, in particular, that preferably more than 50% and, particularly advantageously, more than 70% of the energy-absorption element consists of stainless steel.

DRAWING

Further advantages can be gathered from the following description of the drawing. The drawing illustrates exemplary embodiments of the invention. The description and the claims contain numerous features in combination. A person skilled in the art will expediently also look at the features individually and combine them into further expedient combinations.

DETAILED DESCRIPTION OF THE PREFERRED EMBODIMENT

Figure 1:
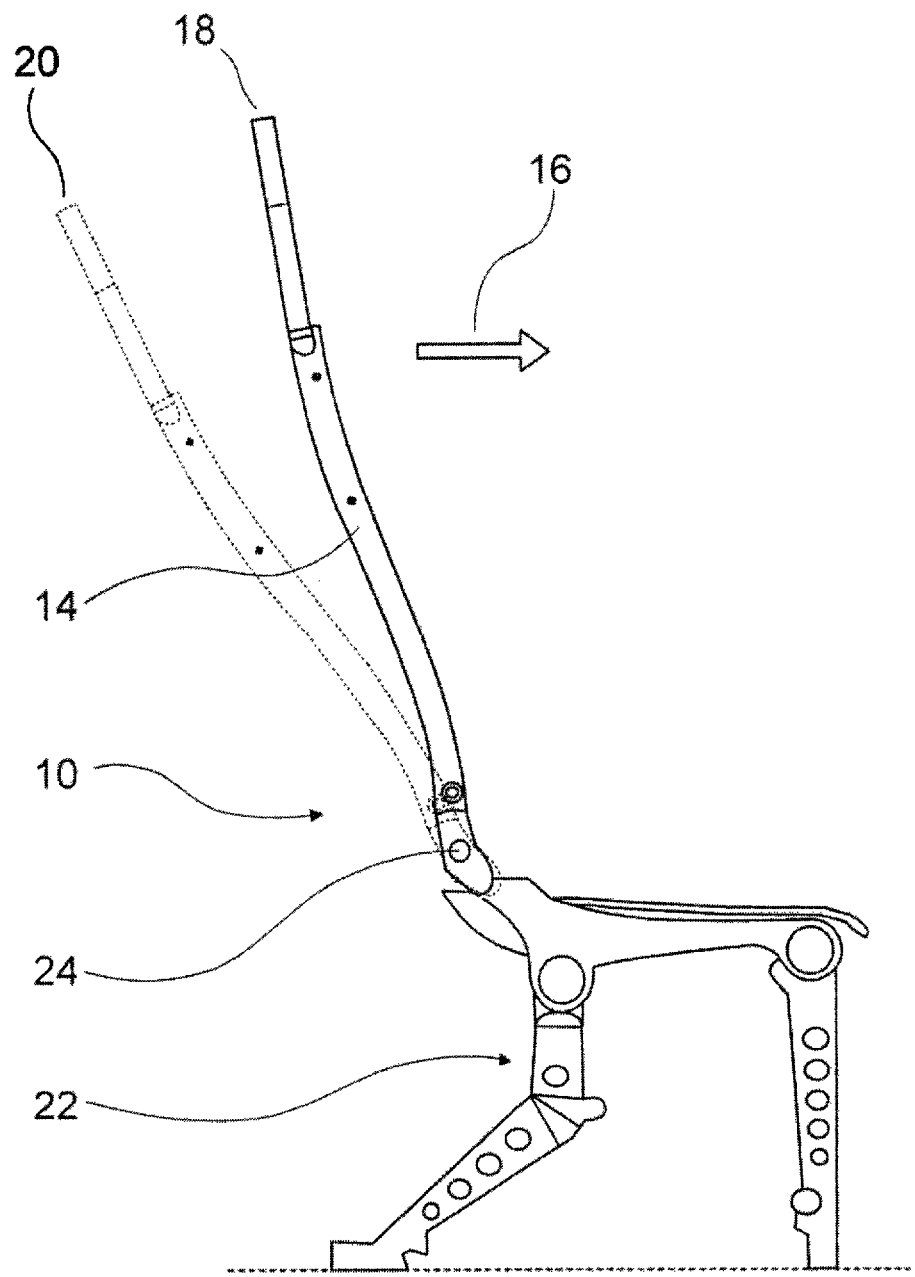
FIG. 1 is a highly schematic side view of a passenger seat.

FIG. 1 shows a highly schematic side view of a passenger seat 10 which is designed as an aircraft seat and is arranged on a floor 12 of an aircraft passenger cabin (not illustrated specifically). It is nevertheless possible for the passenger seat 10 also to be used in other forms of transport, for example in buses, on railways and on ferries. The passenger seat is part of a passenger-seat row (not illustrated specifically), of which a number are arranged, in a manner known per se, one behind the other, with the same orientation, in the aircraft passenger cabin.

The passenger seat has a backrest 14, which can be adjusted, in a normal adjustment range, from a stable comfort position 20, by movement in a forward direction 16, into a stable normal position 18, and it is equipped with a seat structure 22, by means of which the passenger seat 10 is fastened, in a manner known per se, on the floor 12 of the passenger cabin. Adjustment of the backrest 14 takes place as a rotary movement about a bearing pin 24, which is connected to a seat-spacer means 26 of the seat structure 22 and is arranged perpendicularly to the forward direction 16.

Figure 2:
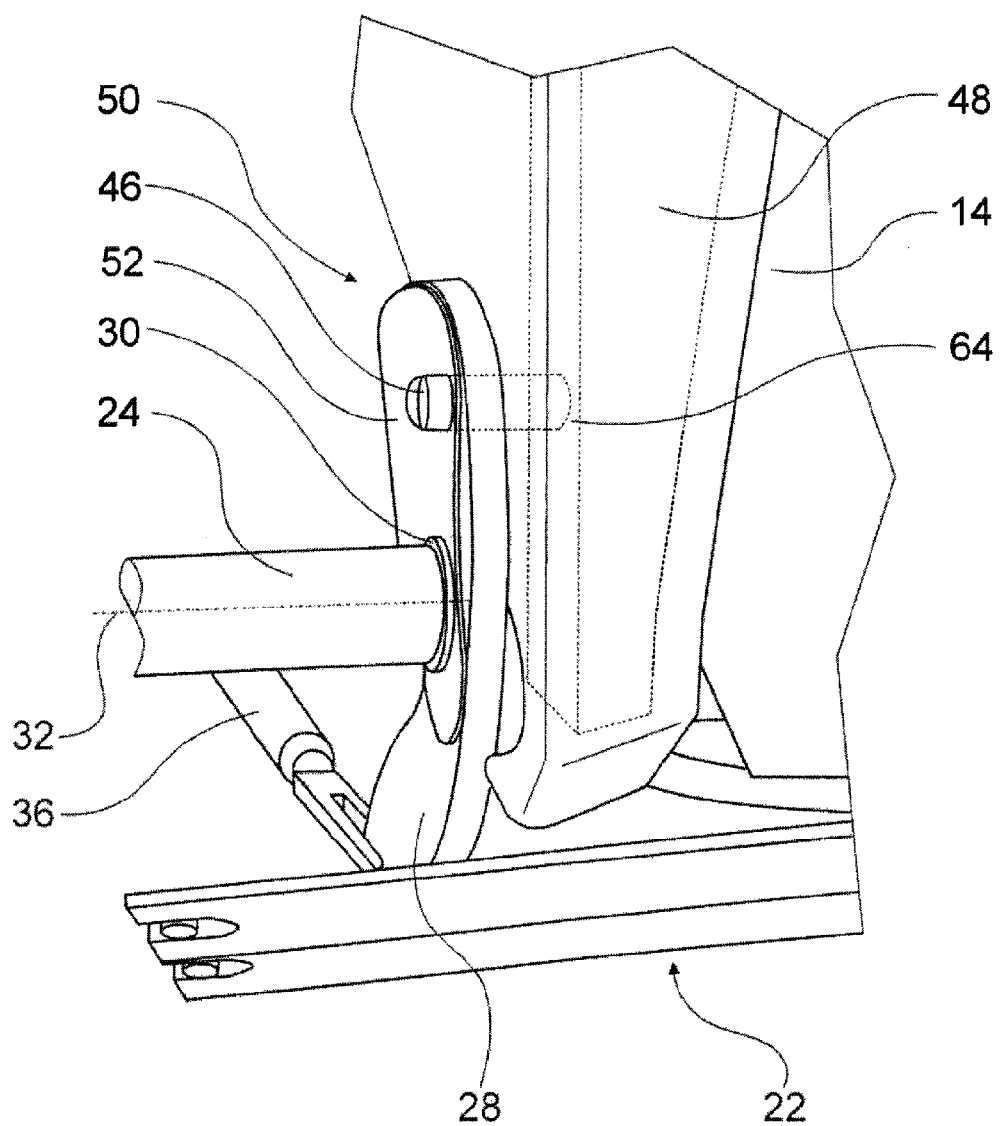
FIG. 2 is a rear view of a seat arrangement of a passenger seat with an energy-absorption unit in the installed state, a backrest being in the normal adjustment range.
Figure 3:
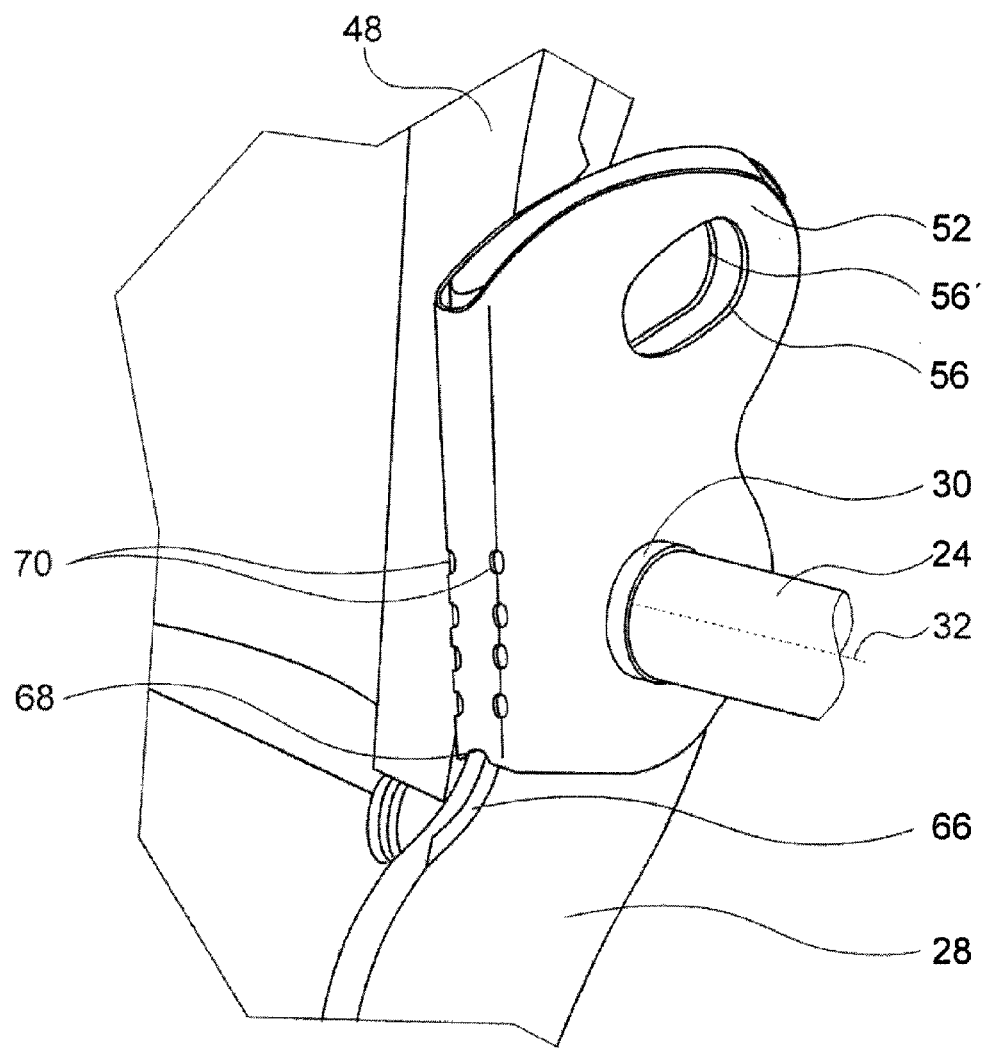
FIG. 3 is a view as seen obliquely from the front of the seat arrangement according to FIG. 2.
Figure 4:
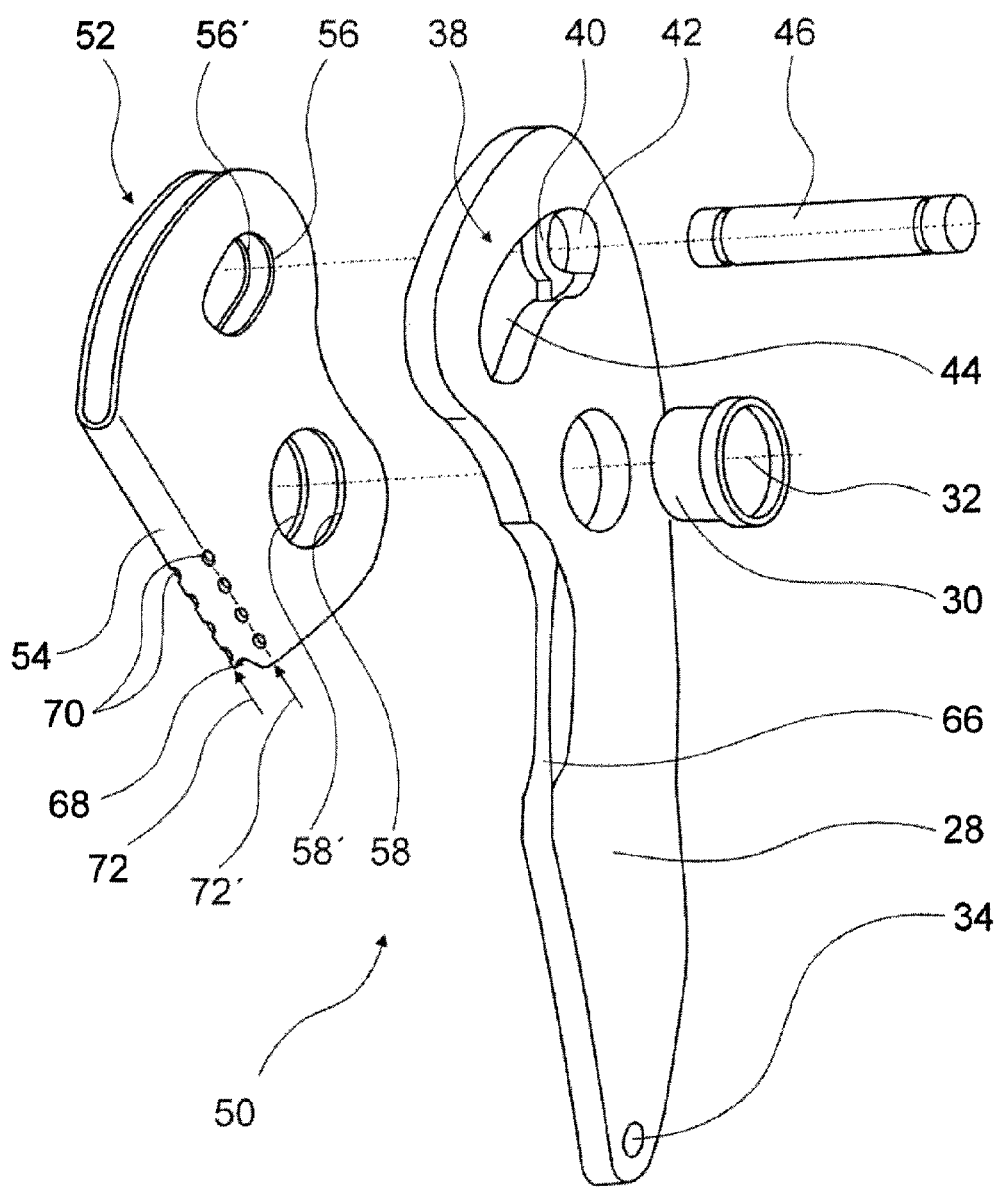
FIG. 4 is an exploded view of an energy-absorption unit.

The passenger seat 10 is equipped with a seat arrangement which comprises a supporting element 28, which is arranged on one side of the backrest 14 (FIGS. 2 and 3). The supporting element 28 is provided for coupling the backrest 14 to the seat structure 22 and serves to support the backrest 14, in the normal position 18, in relation to the seat structure 22. The supporting element 28 comprises a bearing element 30 with a bearing axis 32, the bearing element being designed as a bearing bushing for receiving the bearing pin 24 and being intended for bearing the backrest 14 in a rotatable manner about the bearing axis 32 (FIG. 4). At one of its ends, the supporting element 28 is provided with a through-hole 34, which serves for coupling the supporting element 28 to a pneumatic spring 36, which is provided, in a manner which is known per se, in order to assist movement of the backrest 14 from the comfort position 20 into the normal position 18 (FIG. 2).

At an upper end, the supporting element 28 is provided with a slot unit 38 (FIG. 4), which is arranged in a radial direction in relation to the bearing axis 32. The slot unit 38 comprises a securing element 40, which is designed as a crosspiece and subdivides the slot unit 38 into a relatively small section 42 and a larger section 44, wherein the relatively small section 42 of the slot unit 38 is provided for receiving a pin-design coupling element 46 of the seat arrangement. The securing element 40 is provided in order to limit movement of the backrest 14, within the normal adjustment range, in the forward direction 16. The coupling element 46 is fixed to a U-shaped frame element 48 of the backrest 14 (FIGS. 2 and 3), and therefore, when the backrest 14 is moved in the normal adjustment range, both the backrest 14 and the supporting element 28 are pivoted about the bearing axis 32.

The seat arrangement also has an energy-absorption unit 50, which is provided in order to absorb movement energy in the event of impact. The energy-absorption unit 50 comprises the supporting element 28 and is equipped with an energy-absorption element 52, which is formed separately from the supporting element 28 (FIG. 4).

The supporting element 28 and the energy-absorption element 52 interact, in the event of impact, in order to dissipate impact energy, in a manner which will be described in more detail hereinbelow.

The energy-absorption element 52 comprises a thin metal plate made of stainless steel (FIG. 4). It has, in a section plane located parallel to the floor 12 of the passenger cabin, a U-shaped profile and is also provided with a plurality of through-holes 56, 56', 58, 58' arranged symmetrically in relation to a front edge of the energy-absorption element 52. The through-holes 56, 56' are designed as slots of which the center lines are oriented in a radial direction in relation to the bearing axis 32. In a ready-for-operation state (FIG. 5), the U-shaped profile of the energy-absorption element 52 engages around an upper end of the supporting element 28, wherein the lower through-holes 58, 58' of the energy-absorption element 52 are in alignment with the bearing element 30 of the supporting element 28, and the two through-holes 56, 56', which are arranged in an upper part of the energy-absorption element 52, free the relatively small section 42 of the slot unit 38 of the supporting element 28 for receiving the coupling element 46.

The bearing bushing of the supporting element 28 can be rotated freely in the two lower through-holes 58, 58' of the energy-absorption element 52 (FIG. 4). During movement in the normal adjustment range of the backrest 14, in addition to the backrest 14 and the supporting element 28, the energy-absorption element 52 is also pivoted about the bearing axis 32 by the pin-design coupling element 46 of the seat arrangement, this coupling element passing through both the relatively small section 42 of the slot unit 38 of the supporting element 28 and the two through-holes 56, 56', which are arranged in the upper part of the energy-absorption element 52. The energy-absorption unit 50 has a delay element, which is formed by the slot-design through-holes 56, 56' and, in the event of impact, once the normal adjustment range of the backrest 14 has been exceeded, delays the dissipation of impact energy by a predetermined period of time. Once the normal adjustment range of the backrest 14 has been exceeded, with the backrest 14 moving in the forward direction 16, carrying along of the energy-absorption element 52 by the coupling element 46 is delayed, since the coupling element 46 first of all has to reach a periphery of the through-holes 56, 56' which is oriented in the forward direction 16, before the energy-absorption element 52 can be entrained by the coupling element 46.

Figure 7:
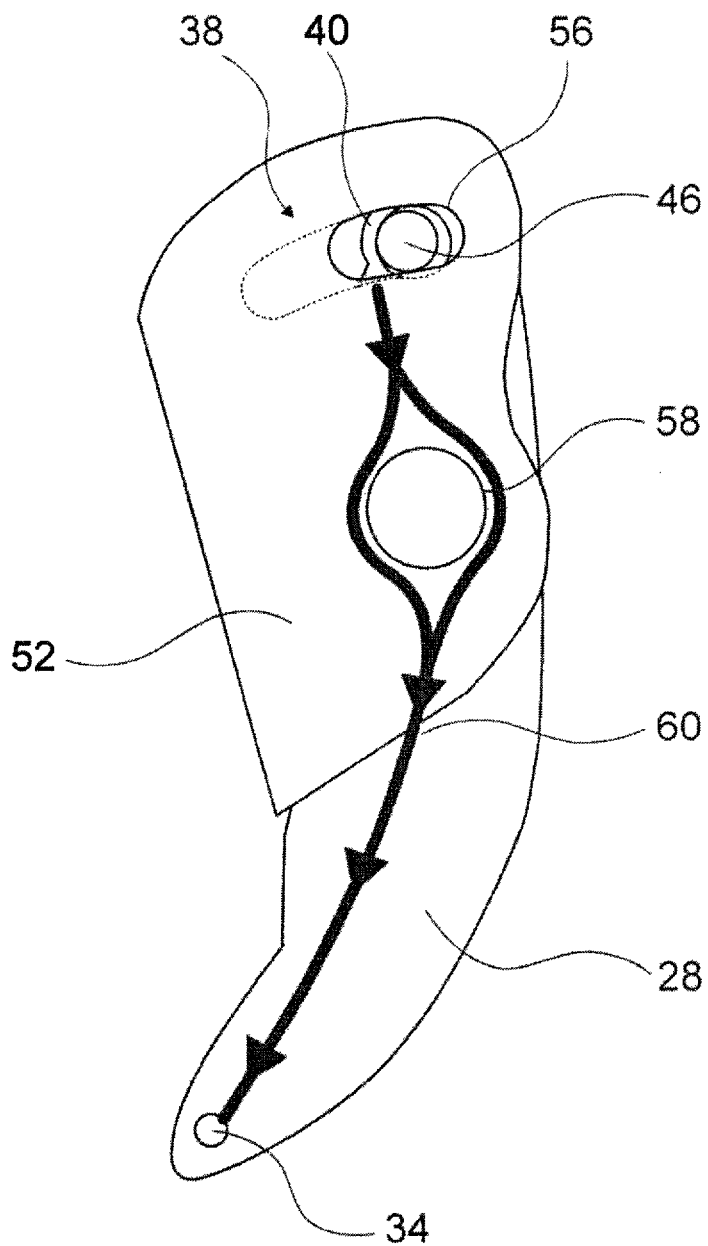
FIG. 7 is a perspective view of a first force-introduction path, in the normal adjustment range of the backrest.

FIG. 7 illustrates a first path 60, which is within the normal adjustment range of the backrest 14 and by means of which a force which acts on the backrest 14 in the forward direction 16 is introduced into the seat structure 22. This force-introduction path 60 runs from coupling locations 64, where the U-shaped frame element of the backrest 14 is coupled to the pin-design coupling elements 46 of the seat arrangement (FIG. 2), along the supporting element 28, continuing via the pneumatic spring 36, which has its end which is directed away from the supporting element 28 articulated to the seat structure 22, and terminates in the seat structure 22. The energy-absorption element 52, in this operating state, is not subjected to force-induced loading by the backrest 14.

When a predetermined force to which the backrest 14 is subjected in a forward direction is exceeded, for example in the event of impact, the crosspiece-design securing element 40 is intended to break, to free the larger section 44 of the slot unit 38 of the supporting element 28 for movement of the pin-design coupling element 46 of the seat arrangement and to make it possible for the normal adjustment range of the backrest 14 to be exceeded in the forward direction 16 (FIG. 4). As the backrest 14 continues to move further in the forward direction 16, the pin-design coupling element 46 of the seat arrangement strikes against that periphery of the through-holes 56, 56' which is oriented in the forward direction 16. In this operating state, the coupling element 46 subjects the energy-absorption element 52 to a torque about the bearing axis 32 and causes the energy-absorption element 52 to be clamped with a centering element 66 of the supporting element 28 (FIG. 8), this centering element being designed as a cutting edge. The delay element causes a time delay in the action of the energy-absorption element 52 being carried along by the coupling element 46, as a result of which, in the event of impact, it is possible for the impact of a passenger striking against a rear side of a backrest 14 of the passenger seat 10 arranged in front of him to be time-controlled and thus for the impact position on the rear side of the backrest 14 to be influenced.

Figure 8:
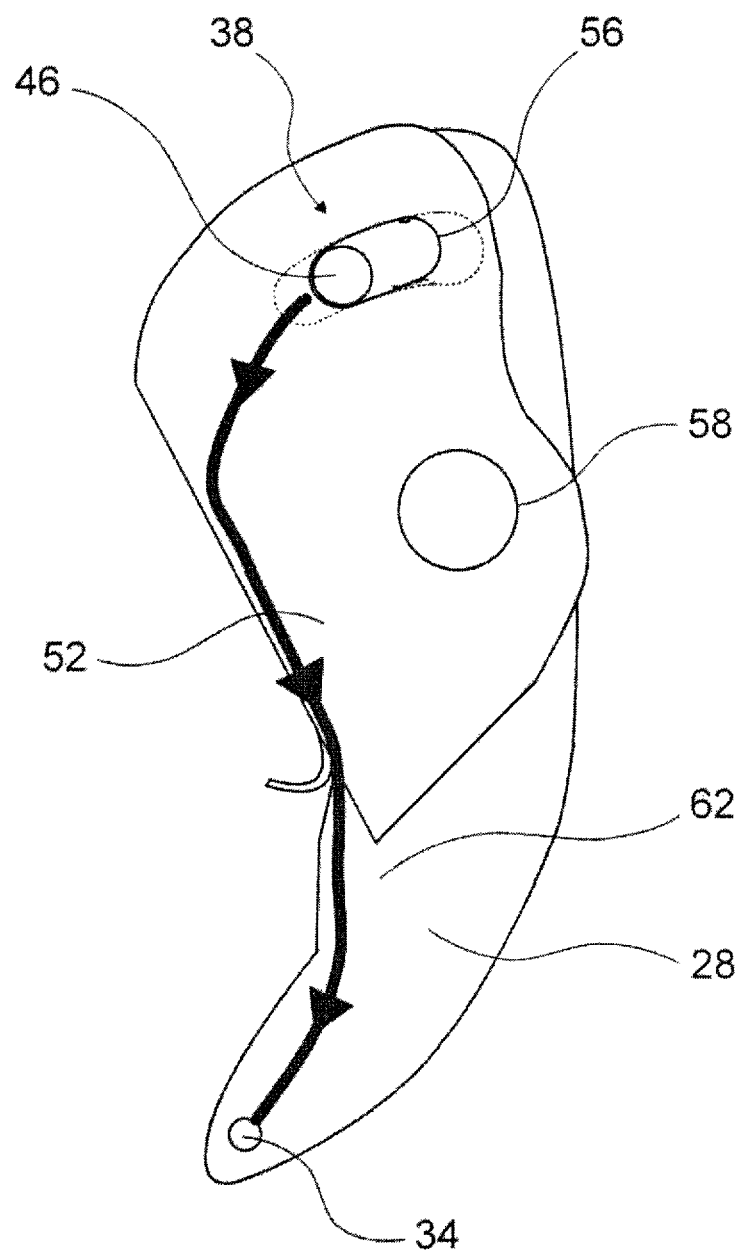
FIG. 8 is a perspective view of a second force-introduction path, once the normal adjustment range of the backrest has been exceeded.

Once the normal adjustment range has been exceeded, there is a second path 62, by means of which the force which acts on the backrest 14 is introduced into the seat structure 22 (FIG. 8). In contrast to the first force-introduction path 60 in the operating state of the normal adjustment range of the backrest 14, the second force-introduction path 62 runs from the coupling locations 64, where the U-shaped frame element 48 of the backrest 14 (FIGS. 2 and 3) is coupled to the pin-design coupling elements 46 of the seat arrangement, along the front edge 54 of the energy-absorption element 52, opens out into the supporting element 28 at a lower end of the front edge 54 of the energy-absorption element 52, continues via the pneumatic spring 36 and terminates in the seat structure 22. When the normal adjustment range of the backrest 14 is exceeded, the energy-absorption element causes a flux of force to be deflected from the first force-introduction path 60 to the second force-introduction path 62. The energy-absorption element 52, in this operating state, is subjected to force-induced loading by the backrest 14, since the coupling element of the seat arrangement subjects the energy-absorption element 52 to a torque about the bearing axis 32.

The energy-absorption element 52 is provided in order to absorb energy by plastic deformation when the normal adjustment range of the backrest 14 is exceeded. The energy absorbed is taken from movement energy of the backrest 14 and converted into heat by the plastic deformation of the energy-absorption element 52.

Figure 5:
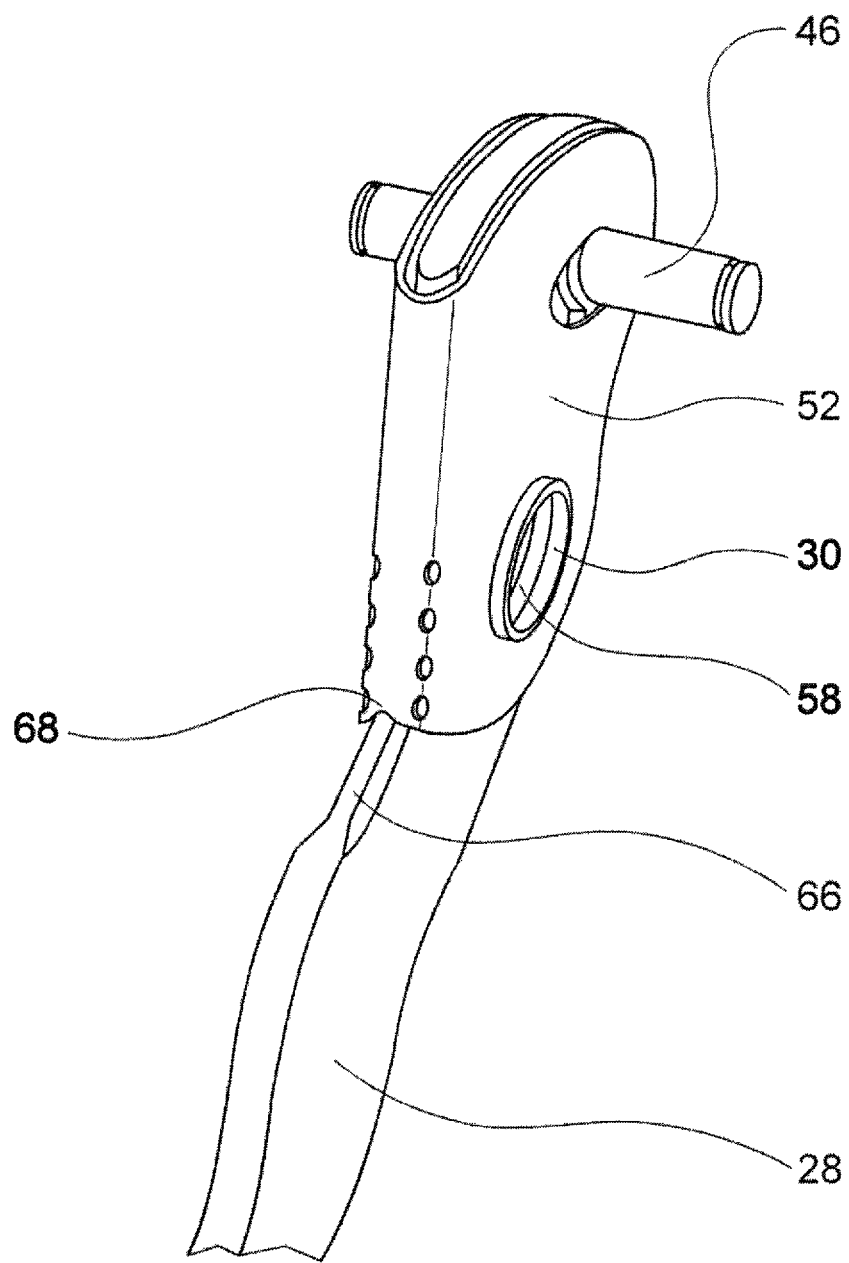
FIG. 5 is a perspective view of an energy-absorption unit in an assembled state.
Figure 6:
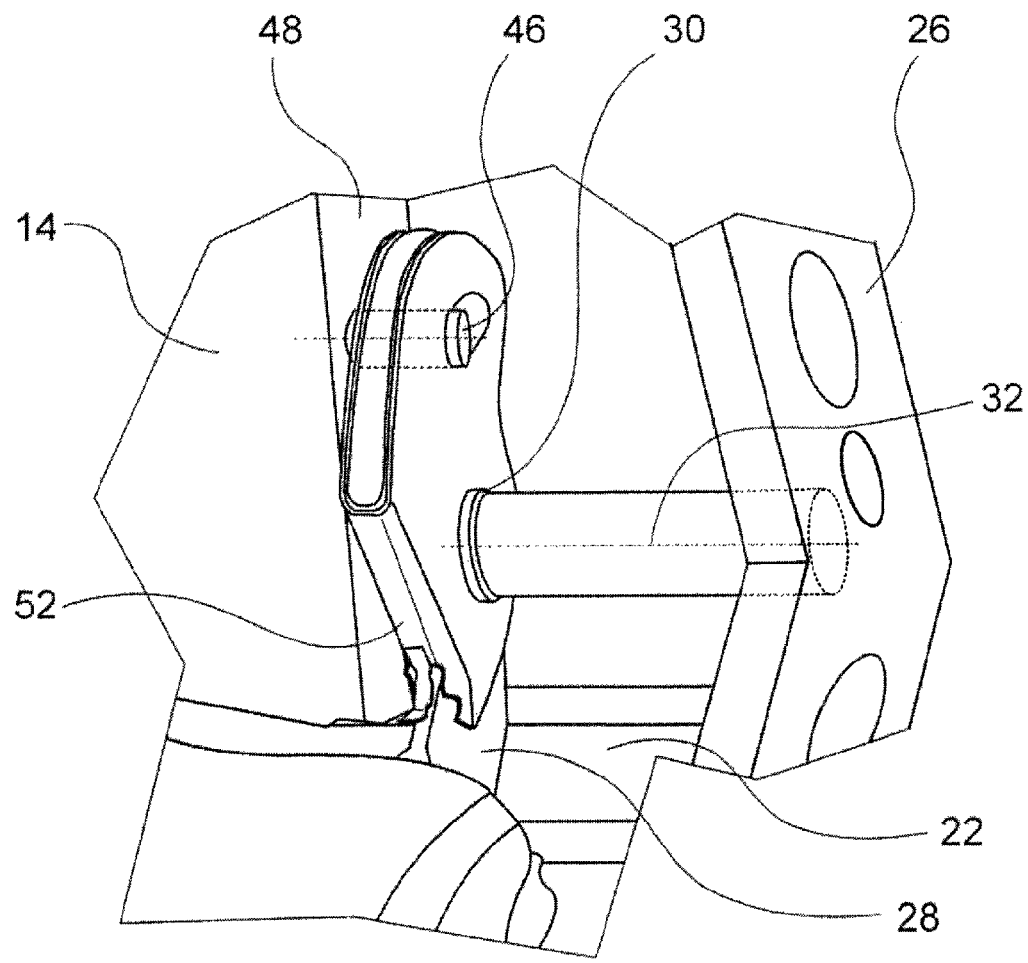
FIG. 6 is a perspective view of a seat arrangement of a passenger seat with an energy-absorption unit in the installed state, the normal adjustment range of the backrest having been exceeded.

In order to weaken the mechanical strength, the energy-absorption element 52 has a plurality of weakening elements 70 (FIGS. 4 and 5) which are designed as holes, are arranged in two rows parallel to the front edge 54 of the energy-absorption element 52 and are provided in order to define predetermined breaking directions 72, 72' in the case of the second force-introduction path 62, which is generated as a result of the normal adjustment range of the backrest 14 being exceeded. FIG. 6 illustrates an energy-absorption element 52, in a passenger seat, deformed plastically by impact. In the region of a location of contact between the lower region of the front edge 54 of the energy-absorption element 52 and the supporting element 28, the energy-absorption element 52 has been torn apart along the predetermined breaking directions 72, 72' and widened outward, and therefore the backrest 14 remains freely movable and can be adjusted into the normal position 18 with only a small amount of force being applied. Controlled deformation of the energy-absorption element 52 can be achieved by the centering element 66 of the supporting element 28, this centering element being designed as a cutting edge, and a corresponding centering element 68, defined as a round notch, in the lower region of the front edge 54 of the energy-absorption element 52, this being provided in order to center the energy-absorption element 52 in the case of the normal adjustment range of the backrest 14 being exceeded (FIGS. 4 and 5).

As a result of the front edge 54 of the energy-absorption element 52 being deformed in a manner akin to being rolled on, deformation energy absorbed by the energy-absorption element 52 once the normal adjustment range of the backrest 14 has been exceeded is essentially proportional to a displacement distance which is covered by the energy-absorption element 52 and, in FIG. 6, can be equated with a rolled-on distance, and therefore the energy-absorption element 52 absorbs energy uniformly and it is advantageously possible to avoid force-induced impact as a result of sudden accelerations when energy is being absorbed.

Figure 9:
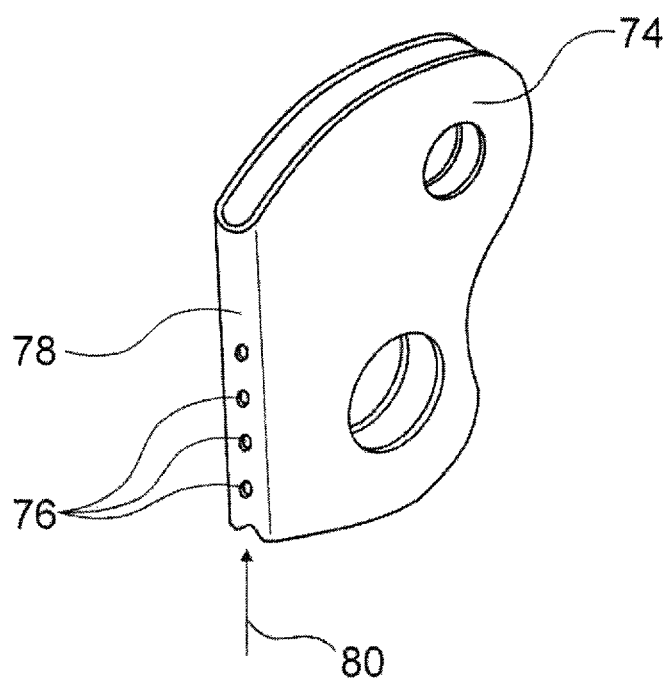
FIG. 9 is a perspective view of a further exemplary embodiment of an energy-absorption element.

FIG. 9 illustrates a further exemplary embodiment of an energy-absorption element 74. In contrast to the exemplary embodiment of FIGS. 1 to 8, the energy-absorption element 74 has weakening elements 76 which are designed as holes, are arranged in a single row parallel to a front edge 78 of the energy-absorption element 74 and are provided in order to define a single predetermined breaking direction 80 in the case of a second force-introduction path, which is generated as a result of a normal adjustment range of a backrest being exceeded.

The invention claimed is:

1. A seat arrangement of a passenger seat comprising:
a backrest having a normal adjustment range from at least one stable comfort position into a normal position by movement in a forward direction,
a seat structure for fastening the passenger seat on a floor, having at least one supporting element for coupling the backrest to the seat structure, and having at least one energy-absorption unit for absorbing movement energy in the event of impact,
the energy-absorption unit comprising the supporting element and an energy-absorption element, the energy-absorption element being formed separately from the supporting element, and in the event of an impact the supporting element and the energy-absorption element interacting and dissipating impact energy, the one supporting element having at least one bearing element with a bearing axis for bearing the backrest in a rotatable manner, and
the energy-absorption unit further including at least one coupling element configured to torque the energy-absorption element about the bearing axis and cause clamping of the energy-absorption element when the normal adjustment range of the backrest is exceeded.

2. The seat arrangement as claimed in claim 1, wherein the energy-absorption unit has a delay element which, in the event of impact, once the normal adjustment range of the backrest has been exceeded, delays the dissipation of impact energy by a predetermined period of time.

3. The seat arrangement as claimed in claim 1, wherein within the normal adjustment range of the backrest, there is a first path by means of which a force which acts on the backrest is introduced into the seat structure and, when the normal adjustment range of the backrest is exceeded, there is a second path by means of which a force which acts on the backrest is introduced into the seat structure, and the energy-absorption element causes a flux of force to be deflected from the first force-introduction path to the second force-introduction path.

4. The seat arrangement as claimed in claim 1, wherein the energy-absorption element is provided in order to absorb energy by plastic deformation when the normal adjustment range of the backrest is exceeded.

5. The seat arrangement as claimed in claim 1, wherein the energy-absorption element has at least one weakening element for weakening the mechanical strength.

6. The seat arrangement as claimed in claim 1, wherein the energy-absorption element has at least two weakening elements, which are provided in order to define a predetermined breaking direction in the case of the second force-introduction path, which is generated as a result of the normal adjustment range of the backrest being exceeded.

7. The seat arrangement as claimed in claim 1, wherein the energy-absorption element comprises at least one centering element, which is provided in order to center the energy-absorption element in the case of the normal adjustment range of the backrest being exceeded.

8. The seat arrangement as claimed in claim 1, wherein the energy-absorption unit has at least one securing element, which is provided in order to limit movement of the backrest, within the normal adjustment range, in at least one direction and, in the case of a predetermined force to which the backrest is subjected, in at least one direction being exceeded, in order to allow the adjustment range of the backrest to be exceeded.

9. The seat arrangement as claimed in claim 1, wherein deformation energy absorbed by the energy-absorption element once the normal adjustment range of the backrest has been exceeded is essentially proportional to a displacement distance covered by the energy-absorption element.

10. The seat arrangement as claimed in claim 1, wherein the energy absorption element engages around the supporting element at least in part.

11. The seat arrangement as claimed in claim 1, wherein the energy-absorption element has a U-shaped profile in at least one section plane.

12. A passenger seat having a backrest which can be adjusted, in an adjustment range, from at least one comfort position, by movement in a forward direction, into a normal position, having a seat structure, for fastening on a floor, and having a seat arrangement as claimed in claim 1.

13. The seat arrangement as claimed in claim 2,
wherein within the normal adjustment range of the backrest, there is a first path by means of which a force which acts on the backrest is introduced into the seat structure and, when the normal adjustment range of the backrest is exceeded, there is a second path by means of which a force which acts on the backrest is introduced into the seat structure, and the energy-absorption element causes a flux of force to be deflected from the first force-introduction path to the second force-introduction path.

14. The seat arrangement as claimed in claim 2,
wherein the at least one supporting element has at least one bearing element with a bearing axis for bearing the backrest in a rotatable manner.

15. The seat arrangement as claimed in claim 3,
wherein the at least one supporting element has at least one bearing element with a bearing axis for bearing the backrest in a rotatable manner.

16. The seat arrangement as claimed in claim 2,
wherein the energy-absorption element is provided in order to absorb energy by plastic deformation when the normal adjustment range of the backrest is exceeded.

17. The seat arrangement as claimed in claim 3,
wherein the energy-absorption element is provided in order to absorb energy by plastic deformation when the normal adjustment range of the backrest is exceeded.

\* \* \* \* \*